(12) United States Patent
Yagi et al.

(10) Patent No.: US 6,188,202 B1
(45) Date of Patent: Feb. 13, 2001

(54) BATTERY CHARGING DEVICE

(75) Inventors: Kazuhiko Yagi; Noboru Sato; Takashi Ishikura, all of Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/340,146

(22) Filed: Jun. 28, 1999

(30) Foreign Application Priority Data

Jun. 29, 1998 (JP) .................................................. 10-182674

(51) Int. Cl.⁷ ................. H02J 7/16; H02J 7/00

(52) U.S. Cl. ............................................. 320/150; 320/125

(58) Field of Search .................................... 320/150, 152, 320/153, 125

(56) References Cited

U.S. PATENT DOCUMENTS

| | | | |
|---|---|---|---|
| 5,395,708 | * 3/1995 | Hall | 429/120 |
| 5,668,461 | * 9/1997 | Hancock et al. | 320/150 |
| 5,994,879 | * 11/1999 | Hsieh | 320/134 |

* cited by examiner

*Primary Examiner*—Peter S. Wong
*Assistant Examiner*—Gregory J Toatley
(74) *Attorney, Agent, or Firm*—Arent Fox Kintner Plotkin & Kahn, PLLC

(57) ABSTRACT

In a battery charging device, an ECU (30) has: an ordinary charge control section (34) adapted to charge a battery (12) in an ordinary charge mode; an under charge control section (36) adapted to charge a battery (12) in an under charge mode; and mode switching controller (38) which switch the output paths of the ordinary charge control section (34) and the under charge control section (36), thereby to select one of the charge modes.

11 Claims, 4 Drawing Sheets

BATTERY CHARGING DEVICE

BACKGROUND OF THE INVENTION

1. Technical Field of the Invention

This invention relates to a battery charging device for controlling the charging of a battery which is a power source mounted in an electric vehicle, etc.

2. Discussion of the Prior Art

Conventionally, in charging a battery, a charging operation is vehicleried out until the battery is fully charged. In other words, the charging operation is continued until the SOC (state of charge) representing the amount of charge of a battery reaches about 100% to 103%. The fact that the charging operation is carried out until the battery is fully charged as was described above, is advantageous in that the amount of discharge current (the unit being Ah) of the battery can be sufficiently obtained.

If the battery has been charged fully, the sufficient discharge current of the battery can be obtained. However, the fact that the battery has been charged fully suffers from the following problems: That is, since the battery is charged over its capacity, during the final period of the charging operation, the charging power is liable to be wasted. For the same reason, the battery is liable to be deteriorated.

Furthermore, the charging period is long. Therefore, the battery may not be used when it is required to use it. More specifically, for instance, an electric vehicle or the like which is driven by the battery may not be used.

SUMMARY OF THE INVENTION

It is an object of the invention to provide a battery charging device capable of reducing the charging cost and shortening the charging time.

In a battery charging device according to the invention, selecting means selects a first charge operation using first charge control means adapted to charge a battery until the amount of charge of the battery reaches a first charge value, or a second charge operation using second charge control means adapted to charge the battery until the amount of charge of the battery reaches a second charge value which is smaller than the first charge value.

Hence, it can be selected one of (1) a first charging operation obtained by the first charge control means which is performed with the preference that the battery is sufficiently long in the time of use or (2) a second charging operation obtained by the second charge control means which is performed with the preference that the charging cost is reduced and the charging time is shortened.

In this connection, temperature detecting means for detecting a battery temperature is provided so that the selecting means is suitably operated according to a battery temperature detected by the temperature detecting means. That is, the charge operation can be suitably performed according to the battery temperature.

If the battery temperature is lower than, for instance, 35° C., the charge operation using the second charge control means is preferentially selected. Alternatively, when the battery temperature is higher than 35° C.; in other words, only when the charge operation using the second charge control means is not executed, the charge operation using the first charge control means is selected. Therefore, the battery charging operation can be carried out with the preference that the charging cost is reduced, and the charging time is shortened.

Furthermore, the selecting means can be designed to select one of the charging operations according to the operation instruction provided by the external operation means. In this case, it can be determined according to the will of the user whether the battery is charged with the preference that the battery is long in the time of use or with the preference that the charging cost is reduced and the charging time is shortened.

In the case where the battery temperature is higher than a predetermined value, the selecting means selects the charge operation using the first charge control means regardless of the operation instruction of the external operation means. In this case, it is possible to prevent to select the charge operation using the second charge control means even if the battery temperature is the value with which the charge operation using the second charge control means is not executed.

Furthermore, the battery charging device of the invention further comprises display means for displaying a charge operation selected by the selecting means. Hence, the user of the battery can detect it visually which charge operation has been selected.

The nature, utility and principle of the invention will be more clearly understood from the following detailed description and the appended claims when read in conjunction with the accompanying drawing.

DETAILED DESCRIPTION OF THE INVENTION

An embodiment of a battery charging device will be described in detail with reference to the accompanying drawings.

Figure 1:
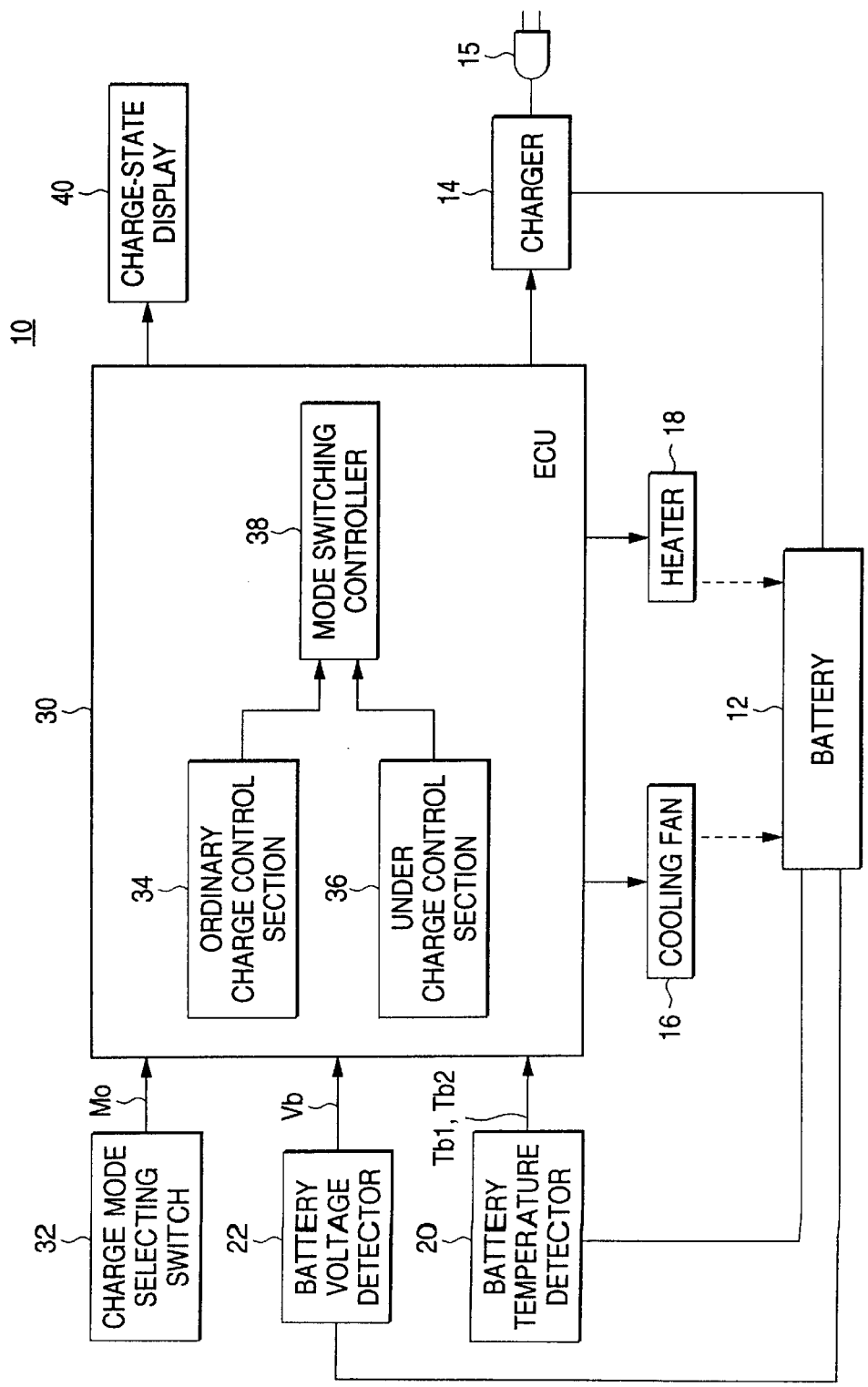
FIG. 1 is a block diagram showing the arrangement of a battery charge device according to the invention.

FIG. 1 shows the arrangement of a battery charging device 10, the embodiment of the invention.

The battery charging device 10 has a charger 14 adapted to charge a battery 12. The charger 14, which is in the state of charge, is connected through a charging connector 15 to a power source, for instance AC200V, in advance. A cooling fan 16 adapted to cool the battery 12, and a heater 18 adapted to heat the battery 12 are provided near the battery 12.

The battery 12 is connected to a battery temperature detector 20, and battery voltage detector 22. The battery temperature detector 10 is adapted to detect a temperature of the battery 12 (battery temperature Tb1) at the charge start time, and a temperature of the battery (or a battery temperature Tb2) while the latter is being charged. On the other hand, the battery voltage detector 22 is adapted to detect a voltage of the battery (a battery voltage Vb).

In addition, the battery charging device 10 has an ECU30 (Electric Control Unit) 30 which operates as controlling unit, judging unit, processing unit, computing, timer and the like. The ECU is constituted by a CPU (Central Processing Unit); a ROM (Read only memory) which is a memory in which a system program or an application program for detection of a remaining capacity are stored, a RAM (Random Access Memory) which is a memory; and a microcomputer including a timer, and input and output interfaces such as an A/D converter and a D/A converter.

The ECU 30 receives battery temperatures Tb1 and Tb2 from the battery temperature detector 20, and a battery voltage Vb from the battery voltage detector 22, and receives a mode signal Mo (a high-level signal or a low-level signal) from a charge mode selecting switch 32 which is adapted to manually select a charging mode.

In response to those signals, the ECU 30 controls the charger 14, the cooling fan 16, and the heater 18. In this case, as for the state of operation of the cooling fan 16, a high-speed rotation state (high drive state) or a low-speed rotations (low drive state) is selected.

The ECU 30 includes: an ordinary charge control section 34 used for charging the battery 12 in an ordinary charge mode; an under charge control section 36 used for charging the battery 12 in an under charge mode; and mode switching controller 38 which switches the output paths of the ordinary charge control section 34 and the under charge control section 36, to select a charge mode. In this case, the mode switching controller 38 switches the output paths over to one another according to battery temperatures Tb1 and Tb2 from the battery temperature detector 20, a battery voltage Vb from the battery voltage detector 22, and a mode signal Mo from the charge mode selecting switch 32. The charge mode thus selected is displayed on a charge-state display 40 serving as an indicator.

Before the description of the operation of the circuit shown in FIG. 1, as to conducive to a full-understanding of the invention, the specific features of the ordinary charge mode and the under charge mode will be described with reference to the following Table 1:

TABLE 1

|  | Charge ending condition | Charging current (c) | SOC(%) | Charging time | Charging efficiency | Discharging time |
|---|---|---|---|---|---|---|
| Under Charge mode | dVb/dt | 0.3 | 90–95 | Short | High | Short |
| Ordinary charge mode | DTb2/dt | 0.2 | 100–103 | Long | Low | Long |

In the ordinary charge mode, the battery 12 is charged until the SOC (state of charge) representing the amount of charge of the battery 12 reaches about 100% to 103% (a first amount of charge). When the battery 12 is charged in the ordinary charge mode, it is charged over the capacity thereof. Consequently, during the final charging period, the charging power is wasted, as a result of which the charging efficiency is lowered, and the charging time is increased. On the other hand, the amount of discharge current of the battery is increased.

In the under charge mode, the battery 12 is charged until the SOC reaches about 90% to 95% (a second amount of charge). Hence, when the battery is charged in the under charge mode, the charge time is decreased, and the charging efficiency is increased, while the amount of discharge current is decreased.

That is, in the ordinary charge mode, the charging operation of the battery 12 is carried out with the preference that the time of use takes precedence over other data. On the other hand, in the under charge mode, the charging operation is carried out with the preference that the charging cost is reduced, and the charging time is shortened.

Figure 2:
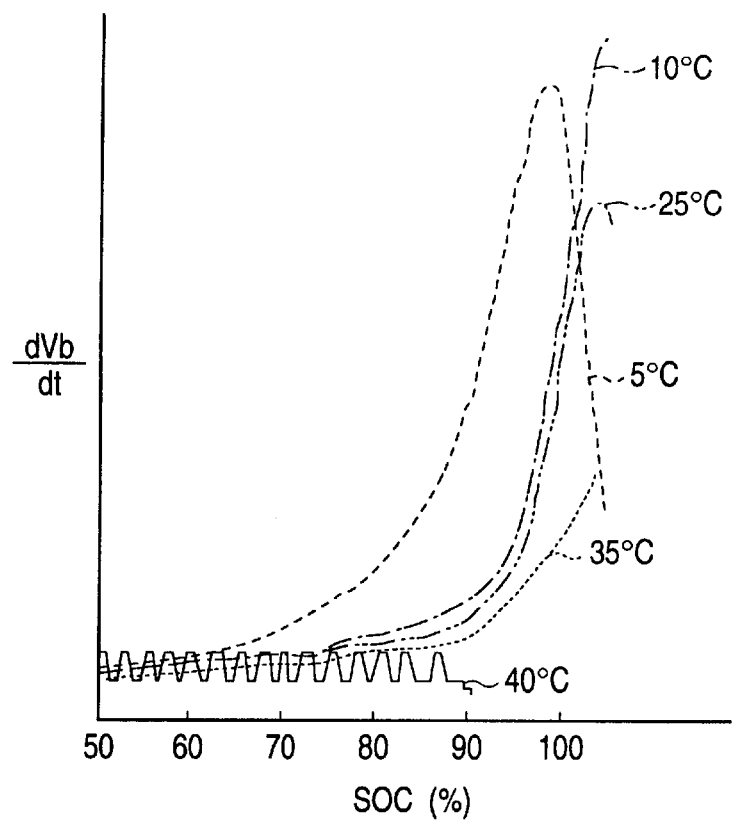
FIG. 2 is a graphical representation indicating a characteristic of battery voltage variation with battery temperature at the charge start time instant.
Figure 3:
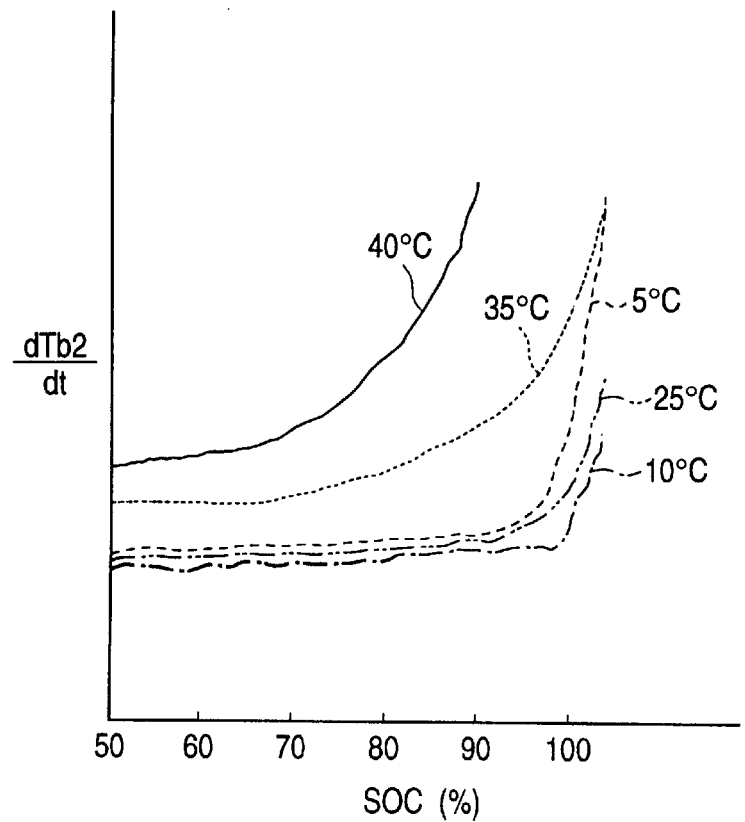
FIG. 3 is a graphical representation indicating a characteristic of battery temperature variation with battery temperature at the charge start time instant.

In the under charge mode, the completion of charge is determined according to the time variation rate of the battery voltage Vb (battery voltage variation dVb/dt). On the other hand, in the normal charge mode, the completion of charge is determined according to the time variation rate of the temperature Tb2 of the battery which is being charged (battery temperature variation dTb2/dt). This is because of the following fact: As shown in FIG. 2, the battery voltage variation dvb/dt begins to abruptly increase with SOC=about 90% to 95%. On the other hand, as shown in FIG. 3, the battery temperature variation dTb2/dt begins to abruptly increase with SOC=about 100% to 103%.

In the under charge mode, the charging operation is carried out with a charging current of about 0.3 c (where c is the rated capacity (Ah) of the battery 12); while in the ordinary charge mode, the charging operation is carried out with a charging current of about 0.2 c.

Now, mainly the charge control by the ECU 30 in the battery charging device 10 (shown in FIG. 1) will be described with reference to FIGS. 4 through 7, flow charts.

Figure 4:
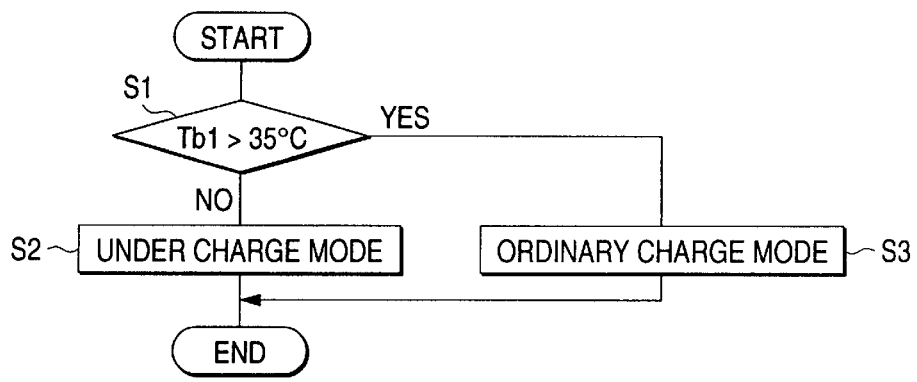
FIG. 4 is a flow chart for a description of a first embodiment of a charge control operation.

A first embodiment of the charge control operation shown in FIG. 4 will be described.

When the charging operation of the battery 12 is started, the ordinary charge mode or the under charge mode is selected according to the battery temperature Tb1 at the charge start time which is detected by the battery temperature detector 20 (Step S1). More specifically, it is determined whether or not the battery temperature Tb1 is higher than 35° C. If the battery temperature Tb1 is equal to or lower than 35° C., the mode switching controller 38 selects the under charge control section 36. In the case where the battery temperature Tb1 is higher than 35° C., the mode switching controller 38 selects the ordinary charge control section 34.

In Step S1, if the under charge control section 36 is selected, the battery 12 is charged in the under charge mode (Step S2). In this case, the completion of charge is determined according to the battery voltage variation dvb/dt. On the other hand, in Step S1, if the ordinary charge control section 34 is selected, the battery 12 is charged in the ordinary charge mode (Step S3). In this case, the completion of charge is determined according to the battery temperature variation dTb2/dt.

The reason why in the case where, in Step S1, the battery temperature Tb1 at the charge start time is higher than 35° C., the under charge mode is not selected, is as follows: As shown in FIG. 2, as the battery temperature Tb1 increases, with Soc=about 90% to 95% the battery voltage variation dVb/dt increases slowly, which makes it difficult to determine whether or not the battery charging operation has been accomplished.

As is apparent from the above description, in the first embodiment of the charge control operation, the under charge mode is selected as the default mode which is the standard set mode. If the battery 12 cannot be charged in the under charge mode; that is, only in the case where the battery temperature Tb1 at the charge start time is higher than 35° C., the under charge mode is switched over to the ordinary charge mode, so that the battery 12 is charged with the charging cost decreased and with the charging time reduced.

Figure 5:
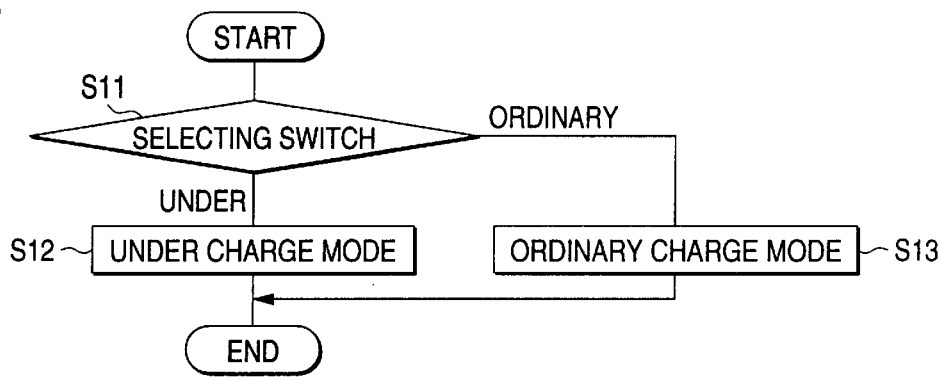
FIG. 5 is a flow chart for a description of a second embodiment of the charge control operation.

Now, a second embodiment of the charge control operation will be described with reference to FIG. 5.

When the battery 12 charging operation is started, the ordinary charge mode or the under charge mode is selected according to the operation of the charge mode selecting switch 32 (Step S1). More specifically, when the charge mode selecting switch 32 selects the under charge mode; that is, in the case where the mode signal Mo is at high level, the mode switching controller 38 selects the under charge control section 36. On the other hand, when the charge mode selecting switch 32 selects the ordinary charge mode; that is, in the case where the mode signal Mo is at low level, the mode switching controller 38 selects the ordinary charge control section 34 (Step S11).

In Step S11, if the under charge control section 36 is selected, the battery 12 is charged in the under charge mode (Step S12). The completion of the battery charging operation in the under charge mode is determined according to the battery voltage vibration dvb/dt as described above. On the other hand, in Step S11, if the ordinary charge control section 34 is selected, the battery 12 is charged in the ordinary charge mode (Step S13). The completion of the battery charging operation in the ordinary charge mode is determined according to the battery temperature charge dTb2/dt.

Thus, in the second embodiment of the charge control operation, the charge mode is switched according to the operation of the charge mode selecting switch 32. Hence, it can be carried out according the user's will whether the battery is charged with the preference that the battery-using-time takes precedence over the others, or the battery is charged with the preference that the charging cost is decreased and the charging time is reduced.

Figure 6:
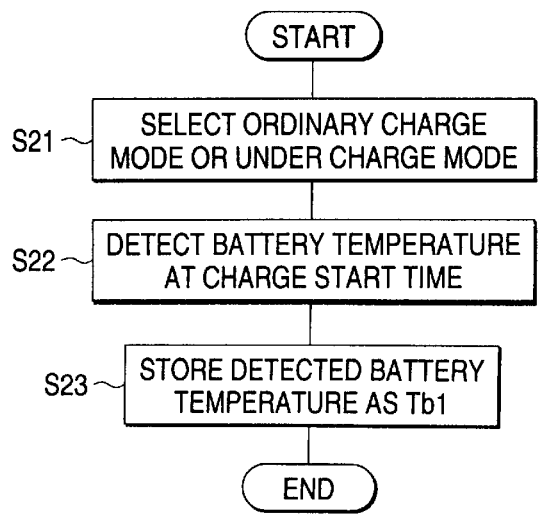
FIG. 6 is a flow chart for a description of a charge start operation in a third embodiment of the charge control operation.
Figure 7:
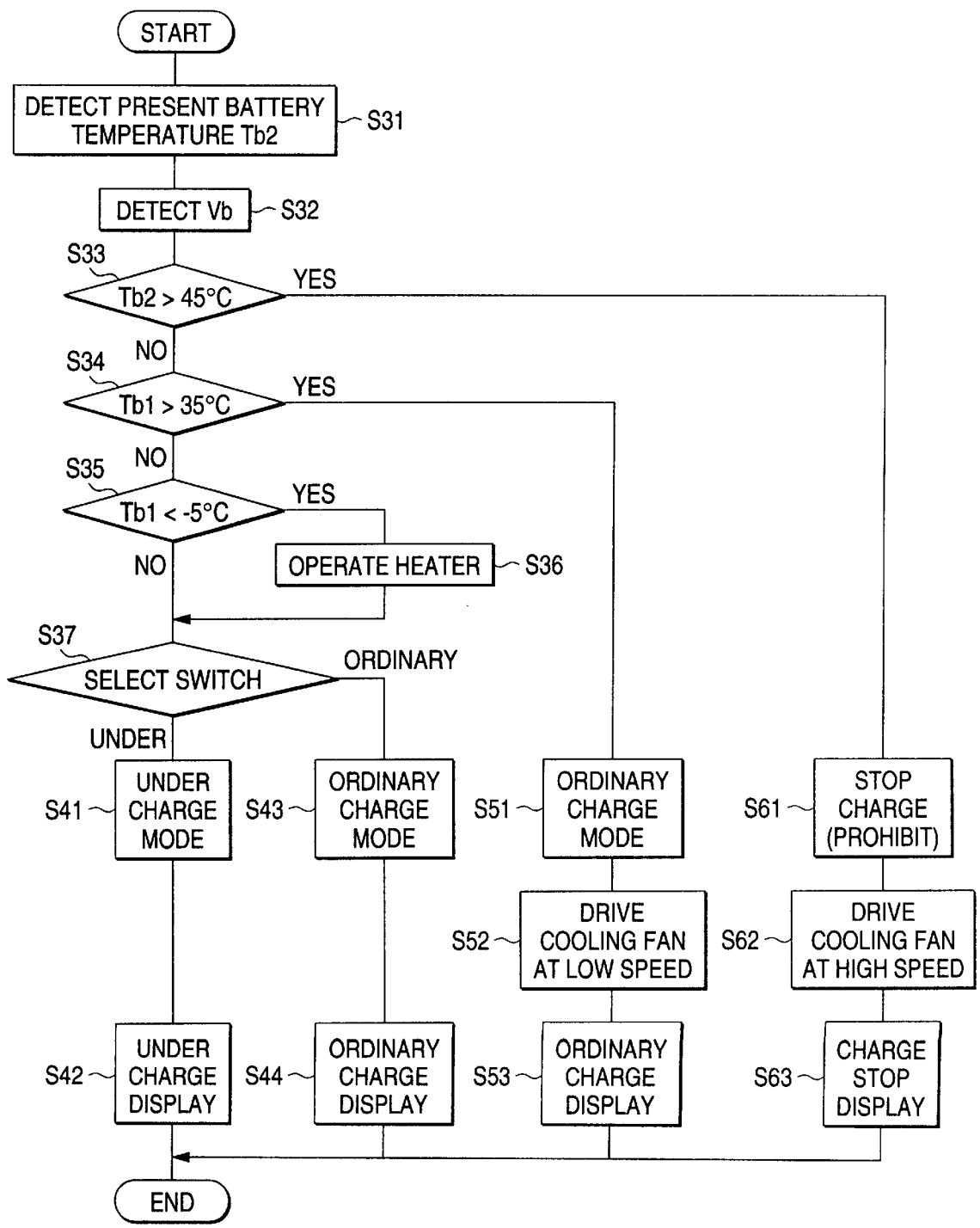
FIG. 7 is a flow chart for a description of a charge operation in the third embodiment of the charge control operation.

Now, a third embodiment of the charge control operation will be described with reference to FIGS. 6 and 7.

First, a charge start operation is carried out.

That is, the charge mode selecting switch 32 is operated to select the ordinary charge mode or the under charge mode (Step S21). If the charge mode selecting switch 32 selects the under charge mode, the mode signal Mo is raised to high level; and if the charge mode selecting switch 32 selects the ordinary charge mode, the mode signal Mo is set to low level.

Thereafter, the battery temperature detector 20 detects the battery temperature Tb1 at the charge start time (Step S22). This battery temperature Tb1 is stored in the RAM of the ECU 30.

Next, a battery charging operation is carried out.

First, the battery temperature detector 20 detects the present battery temperature Tb2 (the battering being charged) (Step S31). Thereafter, the battery voltage detector 22 detects the battery voltage Vb of the battery 12 (Step S32).

Next, the condition for stopping the charging of the battery 12 is detected (Step S33). More specifically, it is detected whether or not the battery temperature Tb2 is higher than 45° C. If the battery temperature Tb2 is higher than 45° C., a charging stopping operation (described later) is vehicleried out. If the battery temperature Tb2 is equal to or lower than 45° C., the charging operation is continued.

In the case where, in Step S33, the determination is made that the battery is kept charged, the condition for inhibition of the under charge mode is detected (Step S34). More specifically, it is detected whether or not the battery temperature Tb1 at the charge start time, which is stored in the RAM, is higher than 35° C. If the battery temperature Tb1 is higher than 35° C., the inhibition of the under charge mode is effected, and the charging operation is carried out in the ordinary charge mode. In the case where the battery temperature Tb1 is equal to or lower than 35° C., the following Step S35 is effected.

In Step S35, the condition for operation of the heater 18 is detected. More specifically, it is detected whether or not the battery temperature Tb1 is lower than −5° C. If the battery temperature Tb1 is lower than −5° C., the heater 18 is operated (Step S36). On the other hand, if the battery temperature Tb1 is equal to or higher than −5° C., the heater 18 is not operated.

Thereafter, the ordinary charge mode or the under charge mode is selected (Step S37). More specifically, in the case where the mode signal Mo is at high level, the mode switching controller 38 selects the under charge control section 36; and in the case where the mode signal Mo is at low level. the mode switching controller 38 selects the ordinary charge control section 34.

In the case where, in Step S37, the under charge control section 36 is selected, the battery 12 is charged in the under charge mode (Step S41). In this case, the charge-state display 40 displays the fact that the battery is charged in the under charge mode (Step S42). In this case, the determination of the completion of the battery charging operation is carried out according to the battery voltage variation dVb/dt.

On the other hand, in the case where, in Step S37, the ordinary charge control section 34 selected, the battery 12 is charged in the ordinary charge mode (Step S43). In this case, the charge-state display 40 displays the fact that the battery is charged in the ordinary charge mode (Step S44). In this case, the determination of the completion of the battery charging operation is carried out according to the battery temperature variation dTb2/dt. This determination may be carried out in a predetermined time interval which elapses from the time instant that the determination of the completion of the battery charging operation is carried out according to the battery voltage variation dVb/dt.

In the case where, in Step S34, the condition for inhibition of the under charge mode is detected, the mode switching controller 38 selects the ordinary charge control section 34, and the battery 12 is charged in the ordinary charge mode (Step S51). In this case, the cooling fan 16 is driven at low speed (Step S52), and the charge-state display 40 displays the fact that the battery is charged in the ordinary charge mode (Step S53). In this case, the determination of the completion of the battery charging operation is carried out according to the battery temperature variation dTb2/dt.

In the case where, in Step S33, the determination of the charging operation stop is effected, the charging operation is stopped (Step S61). In this case, the cooling fan is driven at high speed (Step S62), and the charge-state display 40 displays the fact that the charging operation is stopped (Step S63).

As described above, in the third embodiment of the charge control operation, the selection of the under charge mode is selected if the battery temperature Tb1 at the charge start time is higher than the predetermined value. Therefore, when it is impossible to charge the battery 12 in the under charge mode, the selection of the under charge mode is avoided.

Since the charge-state display 40 displays one of the charge modes, the user of the battery 12 is able to confirm the charge mode in which the battery is being charged.

In the above-described embodiments, the mode switching controller 38 switches the ordinary charge control section 34 over to the under charge control section 36 or the under charge control section 36 over to the ordinary charge control section 34, thereby to select one of the charge modes. Hence, the decision as to whether the charge control operation should be performed with the preference that the battery is long in the time of use, or the charge control operation should be performed with the preference that the charging time is decreased or the charging cost is reduced, can effected.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

With the battery charging device of the invention, it can be determined whether the charge operation should be performed with the preference that the battery is sufficiently long in the time of use or whether the charge operation should be performed with the preference that the charging cost is reduced, and the charging time is decreased.

The aforementioned selection is performed according to the battery temperature, so that the charge operation can be suitably performed.

Furthermore, it can be determined according to the will of the user whether the battery should be charged with the preference that the battery is long in the time of use or whether it should be charged with the preference that the charging cost is reduced, and the charging time is decreased.

Moreover, the difficulty is eliminated that, even if the battery temperature is the value with which the charge operation using the second charge control means is not practical, the charge operation using the second charge control means is selected.

Furthermore, the user of the battery can detect it visually which charge operation has been selected.

Thus, with the battery charge device according to the. invention, the charging cost is reduced, and the charging time is shortened.

What is claimed is:

1. A battery charging device comprising:
   first charge control means for charging a battery until the amount of charge of said battery reaches a first charge value which is set with respect to a full charge amount of the said battery and is close to the full charge amount;
   second charge control means for charging said battery until the amount of charge of said battery reaches a second charge value which is set with respect to the full charge amount of said battery and is less than the first charge value; and
   selecting means for selecting a first charge operation using said first charge control means or a second charge operation using said second charge control means.

2. The battery charging device according to claim 1, further comprising:
   temperature detecting means for detecting a battery temperature;
   wherein said selecting means selects one of the first and second charge operations according to a battery temperature detected by said temperature detecting means.

3. The battery charging device according to claim 1, further comprising: external operation means wherein said selecting means selecting one of the first and second charge operations according to an operation instruction given by said external operation means.

4. The battery charging device according to claim 3, wherein if the battery temperature is higher than a first predetermined value, said selecting means selects said first charge operation regardless of an operation instruction given by said external operation means.

5. The battery charging device according to claim 1, further comprising display means for displaying a charge operation selected by said selecting means.

6. The battery charging device according to claim 1, wherein the first charge value is a state of charge in the range of 100% to 103%, and the second charge value is a state of charge in the range of 90% to 95%.

7. The battery charging device according to claim 2, further comprising cooling means for cooling said battery when the temperature detected by said temperature detecting means is higher than a first predetermined temperature.

8. The battery charging device according to claim 2, further comprising heating means for heating said battery when the temperature detected by said temperature detecting means is lower than a second predetermined temperature.

9. The battery charging device according to claim 1, further comprising voltage detecting means for detecting a voltage of the battery.

10. The battery charging device according to claim 9, wherein a judgement of completion of the charge by the second charge control means is executed based on a voltage detected by said voltage detecting means.

11. The battery charging device according to claim 2, wherein a judgement of completion of the charge by the first charge control means is executed based on a voltage detected by said temperature detecting means.

* * * * *